Figure 1:
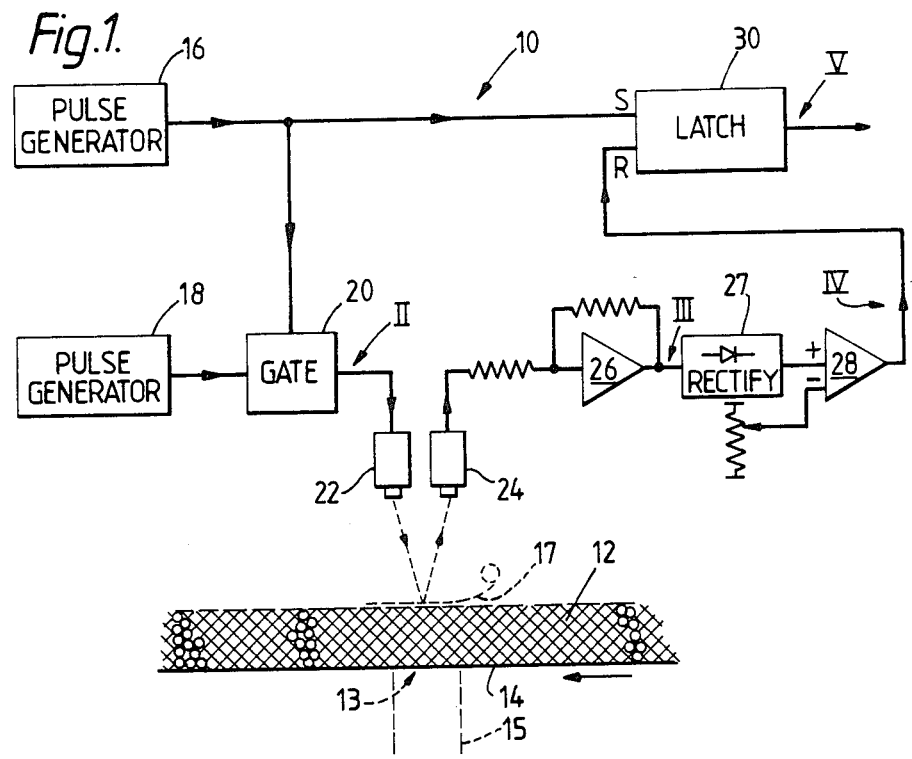

United States Patent [19]

Turner

[11] Patent Number: 4,774,840
[45] Date of Patent: Oct. 4, 1988

[54] DETECTOR FOR ROD-LIKE ARTICLES

[75] Inventor: Peter R. Turner, Church Brampton, England

[73] Assignee: Molins, PLC, Milton Keynes, England

[21] Appl. No.: 2,159

[22] Filed: Jan. 12, 1987

[30] Foreign Application Priority Data

Jan. 11, 1986 [GB] United Kingdom ................. 8600638

[51] Int. Cl.⁴ ............................................ G01N 29/00
[52] U.S. Cl. ..................................... 73/597; 198/524; 209/536
[58] Field of Search ................. 73/620, 624, 627, 631, 73/290 V; 367/98, 99, 908, 95, 118, 124, 151; 198/524, 341, 347; 209/536, 590

[56] References Cited
U.S. PATENT DOCUMENTS 3,596,797 8/1971 Wallenborn .......................... 198/524
3,985,030 10/1976 Charlton ........................... 73/290 V
3,995,732 12/1976 Figes et al. ........................... 198/341
4,344,520 8/1982 Czoch et al. .......................... 340/674
4,528,651 7/1985 Brock et al. ........................... 367/99
4,564,018 1/1986 Hutchison et al. .................... 73/631
4,578,997 4/1986 Soltz ....................................... 73/631

Primary Examiner—Michael J. Tokar
Assistant Examiner—Louis M. Arana
Attorney, Agent, or Firm—Antonelli, Terry & Wands

[57] ABSTRACT

The position of a rod-like article of the tobacco industry is detected by measuring the delay in receiving sound transmitted towards and reflected from the article. In a preferred arrangement a stack level detector comprises a transmitter (22) for pulsed ultrasound (above 20 kHz), a receiver (24) and a circuit (10) for measuring the delay. The circuit (10) may include a latch (30) which generates regular pulses having duration corresponding to the delay.

11 Claims, 1 Drawing Sheet

U.S. Patent    Oct. 4, 1988    4,774,840

DETECTOR FOR ROD-LIKE ARTICLES

This invention relates to a detector for rod-like articles, particularly articles of the tobacco industry such as cigarettes or cigarette filter rods.

In the tobacco industry it is common to convey rod-like articles in a multi-layer stream or stack. It is usual to detect the height or level of the stack at a convenient position, and to control the conveying speed so that the level remains within predetermined limits. The most common form of detector for the level of the stack is a pivoted arm which rests (either directly or indirectly) on the upper surface of the articles and indicates their level by its angular displacement. A detector of this type is shown in UK Patent Specification No. 1372148. Detectors are also known which do not involve contact with the articles. For example, the positions of the articles may be detected by an array of photodetectors, or by a television camera. Examples of these types of detectors are shown in UK Patent Specification No. 1597371.

The present invention provides an alternative form of detector, which is relatively inexpensive and reliable and does not always require physical contact with the articles.

According to the invention apparatus for detecting rod-like articles of the tobacco industry, particularly for detecting the position of uppermost articles in successive portions of a multi-layer stream of articles conveyed past a detecting position, comprises means for transmitting sound towards an article at the detecting position, means for receiving sound reflected by the article, and circuit means for detecting the delay between the transmitted sound and the received sound and for providing a signal indicative of the position of the article. The detecting position is not fixed but may be anywhere within the range of the apparatus, e.g. on a line extending away from the transmitting means. The delay is caused by the relatively slow speed (as compared with that of electromagnetic radiation) of sound. Preferably the transmitted sound is ultrasound (i.e. having a frequency of greater than 20 kHz.).

In a preferred arrangement a pulse echo ranging technique is used. Typically an ultrasonic transmitter and receiver are arranged at suitable positions in relation to the expected position of articles to be detected. For example, the transmitter and receiver may be located above a stack conveyor. Pulses of ultrasound may be generated by a suitable circuit connected to the transmitter. The receiving circuit preferably includes means for generating an output pulse when the received ultrasound exceeds a threshold value. Circuit means may be provided for indicating the delay between the pulse of generated ultrasound and the output pulse. In a preferred arrangement a further pulse is generated having a duration corresponding to this delay. A latch may be used, which is set by the transmitted pulse and reset by the output pulse.

The invention will be further described, by way of example only, with reference to the accompanying diagrammatic drawings, in which:

FIG. 1 is a schematic diagram of a system including a circuit for sensing the height of a stream of cigarettes, and FIGS. 2-5 are diagrams (not to scale) indicating signals respectively at positions II-V in the circuit of FIG. 1.

Figure 2:
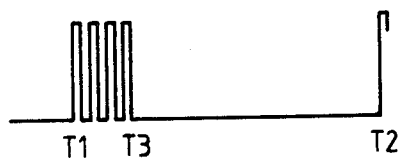

In the system of FIG. 1 an electrical circuit 10 is used to sense the height of a stream 12 of cigarettes carried on an endless band conveyor 14. In a modified arrangement the conveyor 14 could have a junction 13 with a downdrop or chute 15, so that the circuit 10 senses the height at the junction. The circuit 10 includes a first pulse generator 16 which comprises an astable multivibrator which produces a pulse of 1 millisecond (ms) every 10 ms. A second pulse generator 18 comprises a simple astable multivibrator running at 40 kHz. The output of the second pulse generator 18 is passed through a gate 20 which is controlled by the first pulse generator 16 in such manner that the output from the gate comprises 1 ms bursts of 40 kHz every 10 ms (i.e. 100 Hz). This is indicated in FIG. 2, which is a plot of signal amplitude (voltage) against time. Times T1 and T2 are 10 ms apart and times T1 and T3 are 1 ms apart.

The signal from the gate 20 is fed to a first ultrasonic transducer comprising a transmitter 22. This generates 1 ms bursts of ultrasound in accordance with the signal. This ultrasound is directed at the stream 12 and is reflected by the uppermost cigarettes in the stream. Alternatively a flexible membrane 17, which lies on the uppermost cigarettes and partially smooths irregularities in the level, may reflect the ultrasound. A second ultrasonic transducer comprising a receiver 24 is arranged close to the transmitter 22 and generates an electrical signal in response to the reflected ultrasound or echo received.

Figure 3:
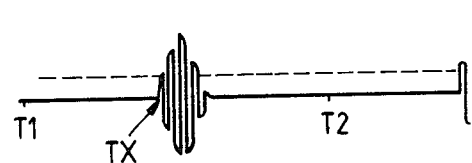
Figure 4:
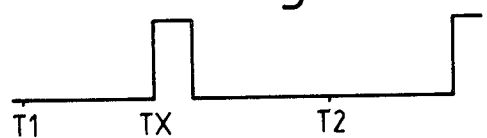

The signal from the transducer 24 is amplified by an amplifier 26, rectified at 27 and subsequently fed into the positive input of a comparator 28. The negative input of the comparator 28 is provided with an adjustable preset bias or reference voltage. The comparator 28 delivers an output pulse when the signal at the positive input exceeds the reference voltage. FIG. 3 is a plot of voltage against time of the signal before rectification. The reference voltage is indicated by the dotted line. This time TX is the time corresponding to the front edge of the output pulse from the comparator 28. FIG. 4 is a plot of voltage against time of the output signal from the comparator 28.

Figure 5:
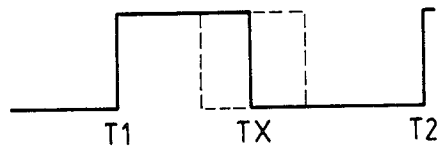

The comparator output signal is applied to the reset input of a latch 30. The set input is directly connected to the output of pulse generator 16. Thus, the latch 30 is set at time T1, corresponding to the start of a 1 ms pulse produced by the generator 16. Subsequently, the latch 30 is reset at time TX, corresponding to the start of the output pulse from the comparator 28. The output signal plot for the latch 30 (voltage against time) is shown by FIG. 5. T1, T2 etc, corresponding to the front edges of the pulses in the signal shown in FIG. 2, are non-variable and occur every 10 ms. TX, corresponding to the trailing edge of each pulse in FIG. 5 and the start of output pulse of comparator 28 is variable (as indicated by the dotted lines in FIG. 5). The length or duration of each pulse, i.e. the period between T1 and TX, is therefore variable and is directly proportional to the ultrasonic path length between the transmitter 22 and receiver 24. (This is because the delay between T1 and TX is caused by the time taken by the ultrasound to travel between the transmitter 22 and receiver 24.) Hence, in effect, the length of each pulse in FIG. 5 is proportional to the distance from the transmitter 22 and receiver 24 to the top of the stream 12.

Since the frequency of the pulses in the FIG. 5 signal is fixed but the pulse length varies linearly with distance, an analogue signal corresponding to this distance may readily be produced by using a simple filter circuit. For example, the filter circuit may generate an output signal having a voltage proportional to this distance. Alternatively, this voltage could be applied as a negative bias to a positive reference voltage equivalent to the voltage generated by a distance corresponding to the distance of the conveyor 14 from the transmitter 22 and receiver 24, so that the output of this circuit would be an analogue signal directly proportional to the height of the cigarette stream 12 on the conveyor 14.

A digital signal may be produced by gating the output signal of latch 30 with a signal from a pulse generator of relatively high frequency and applying the resultant output signal to a counter which is reset by the front edge of each pulse produced by the generator 16. By suitably selecting the high frequency the circuit can in effect be calibrated so that the counter reading corresponds to the distance detected in suitable units.

The signal generated by the latch 30 may be used for control and/or display purposes. Thus, the speed of conveyor 14 may be controlled so that the height of stream 12 remains within predetermined limits.

The transmitter 22 and receiver 24 may comprise transducers available from RS Components Ltd., of Corby, Northamptonshire, NN17 9RS, under part Nos. 307-351 and 307-367 respectively. Alternatively, an ultrasonic ranging module, such as model No. E-201, manufactured by Massa Products Corporation of Hingham, Ma. 02043, USA, and available in the UK from Techmation Ltd., Edgeware, Middlesex, HA8 8JP, may be used.

The delay caused by the relatively low speed of sound in air is approximately 2.9 microseconds per millimeter (at STP), or 5.8 microseconds per millimeter of distance between the transmitter/receiver and detected article. A typical detection range is 75-600 millimeters (delay 435-3480 microseconds). A typical preferred operating distance between the transmitter/receiver and the article to be detected is about 150 millimeters.

It may be found that the preferred operating range is rather further than is convenient in tobacco machinery, where space above a mass flow conveyor is often limited. A solution to this possible problem is to use one or more reflectors, so that the preferred operating distance may be achieved while locating the transmitter and receiver at the most convenient positions. For example, a 45° angle reflector could be positioned just above the stream 12 and the transmitter 22 and receiver 24 moved lower and turned so that they are directed horizontally at the reflector and so that the total path length to and from the expected surface of the stream remains the same as in FIG. 1.

A refinement of the arrangement in FIG. 1 would be to provide automatic correction for variations in temperature and atmospheric pressure by incorporating a nearby duplicate circuit with the transmitter/receiver directed at a target of fixed and known position. Variations in the signal received from the fixed target of the duplicate circuit could then be used to adjust/calibrate the main circuit. Alternatively a portion of the sound from the transmitter of the main circuit could be directed at a fixed target and received by the receiver in such manner that it can be distinguished from the portion which is directed at the detecting position: a full duplicate circuit would not then be necessary.

I claim:

1. Apparatus for detecting rod-like articles of the tobacco industry, particularly for detecting the position of uppermost articles in successive portions of a multi-layer stream of articles conveyed past a detecting position, comprising means for transmitting sound towards an article at the detecting position, means for receiving sound reflected by the article and circuit means for detecting the delay between the transmitted sound and the received sound and for providing a signal indicative of the position of the article, and wherein a reflector is located so that sound passing from the transmitting means to the receiving means is reflected by said reflector as well as by said article at the detecting position.

2. Apparatus as claimed in claim 1, wherein the transmitting means comprises means for transmitting ultrasound having a frequency of greater than 20 kHz.

3. Apparatus as claimed in claim 1, wherein the transmitting means comprises means for generating pulses of sound.

4. Apparatus as claimed in claim 3, wherein the circuit means includes means for generating an output pulse when the received sound exceeds a threshold value.

5. Apparatus as claimed in claim 4, wherein the circuit means includes means for determining the delay between said output pulse and the corresponding transmitted sound.

6. Apparatus as claimed in claim 4, wherein the circuit means is arranged to provide a signal comprising pulses having durations corresponding to said delay.

7. Apparatus as claimed in claim 1, wherein said circuit means comprises a latch which is set by an electrical signal corresponding to the sound transmitted by said transmitting means and reset by an electrical signal derived from said receiving means.

8. Apparatus for detecting rod-like articles of the tobacco industry, particularly for detecting the position of uppermost articles in successive portions of a multi-layer stream of articles conveyed past a detecting position, comprising means for transmitting sound towards an article at the detecting position, means for receiving sound reflected by the article and circuit means for detecting the delay between the transmitted sound and the received sound and for providing a signal indicative of the position of the article, further including a fixed target, means for directing sound at the target, means for receiving sound from the target, and further circuit means for detecting the delay between the received sound and the transmitted sound and for effecting calibration of said circuit means on the basis of such detected delay.

9. A method for controlling the conveyance of a multi-layer stack of rod-like articles of the tobacco industry on an endless band conveyor, comprising the steps of:
   conveying a multi-layer stack of rod-like articles on an endless band conveyor;
   directing sound from a point spaced above said endless band conveyor by a known height which exceeds the maximum expected height of said stack so that said sound is reflected from the upper surface of said moving stack;
   detecting sound reflected from said stack;
   determining the height of rod-like articles on said endless band conveyor from said known height and the delay between the directing and detecting of said sound; and
   controlling the speed of said endless band conveyor in accordance with the determined height of said rod-like articles.

10. A method as claimed in claim 9, wherein said transmitting step includes directing pulses of sound toward the surface of said stack of rod-like articles.

11. Apparatus for detecting rod-like articles of the tobacco industry, particularly for detecting the position of uppermost articles in successive portions of a multi-layer stream of articles conveyed past a detecting position, comprising means for transmitting sound towards an article at the detecting position, means for receiving sound reflected by the article and circuit means for detecting the delay between the transmitted sound and the received sound and for providing a signal indicative of the position of the article, and wherein a membrane having a reflecting surface is disposed on the surface of said stream of articles at said detecting position to reflect said transmitted sound.

* * * * *